United States Patent [19]
Ikezawa et al.

[11] Patent Number: 5,414,505
[45] Date of Patent: May 9, 1995

[54] LENS METER FOR TESTING PROGRESSIVE LENS

[75] Inventors: Yukio Ikezawa; Shinichi Kobayashi, both of Tokyo, Japan

[73] Assignee: Kabushiki Kaisha Topcon, Tokyo, Japan

[21] Appl. No.: 12,599

[22] Filed: Feb. 3, 1993

[30] Foreign Application Priority Data

Feb. 3, 1992 [JP] Japan .................. 4-017641

[51] Int. Cl.⁶ ................................ G01B 9/00
[52] U.S. Cl. .................... 356/127; 356/124
[58] Field of Search ................. 356/124–127

[56] References Cited

U.S. PATENT DOCUMENTS

| | | | |
|---|---|---|---|
| 4,730,924 | 3/1988 | Allard et al. | 356/124 |
| 5,173,739 | 12/1992 | Kurachi et al. | 356/127 |
| 5,303,022 | 4/1994 | Humphrey et al. | 356/124 |

FOREIGN PATENT DOCUMENTS 0200441 9/1986 Japan .

Primary Examiner—Robert P. Limanek
Assistant Examiner—David B. Hardy
Attorney, Agent, or Firm—Knobbe, Martens, Olson & Bear

[57] ABSTRACT

A lens meter having an optical measuring system which can measure optical characteristics of a progressive lens includes a memory means which stores the optical characteristics of each measuring point measured in a range from a far vision region to a near vision region by the optical measuring system, a distinguishing means which compares the optical characteristics of each measuring point stored in the memory means and distinguishes whether the measured points belong to a progressive band or areas located in both right and left sides of the progressive band, a display means which displays a result of the distinguishing means. With this structure, the optical characteristics of each measuring point can be measured ranging from the far vision region to the near vision region by the optical measuring system, and the results are stored in the memory means. Next, by means of the distinguishing means, the optical characteristics of each measuring point are compared and distinguished whether the measured points belong to the progressive band or the areas located in both right and left sides of the progressive band. This distinguished result is displayed by the display means. Thus, the measuring position of the progressive lens can be easily recognized, and thus the near vision power can be accurately measured.

10 Claims, 12 Drawing Sheets

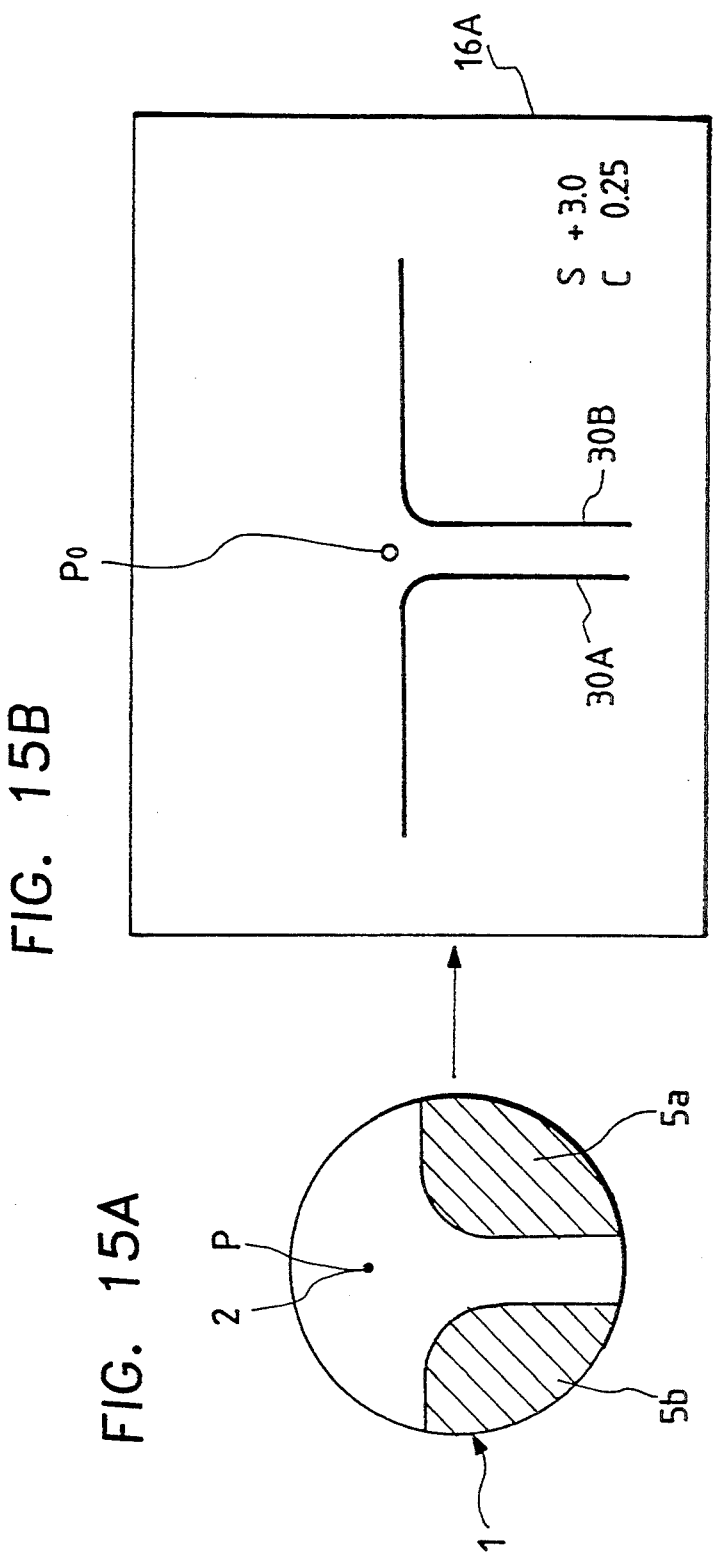

LENS METER FOR TESTING PROGRESSIVE LENS

BACKGROUND OF THE INVENTION

1. Field of the Invention

This invention relates to a lens meter which can accurately recognize measuring points for a framed progressive lens or an unidentified progressive lens.

2. Description of the Prior Art

A progressive lens having no boundary of far and near vision region has been conventionally used for correction of presbyopia. A progressive band of this progressive lens is structured in a consecutive manner on a very complicated non-sphere surface. Thus, the far and near vision region cannot be distinguished easily from the appearance, which is possible, for example in a bifocal lens. Therefore, lens manufacturers provide various kinds of marks or hidden-marks showing a far vision measuring point, a near vision measuring point, a geometric center or an optical center. When measuring spherical power in the far vision region by using a lens meter, a mark of the far vision region is adjusted to an axis of measuring light of the lens meter. Conversely, when measuring spherical power in the near vision region, a mark of the near vision region is adjusted to the axis of measuring light of the lens meter.

It is sometimes necessary to measure a framed progressive lens (spectacle lens) of which periphery of an uncut lens is cut out and put in the glass frame. Since the periphery of the framed progressive lens is ground, some of the marks provided on the uncut lens, including the far and near vision marks, are disappeared. In addition, since the framed progressive lens is not shaped in a symmetrical manner, it is difficult to distinguish the far and near vision marks from their appearances.

Therefore, each manufacturer provides a lens mark sheet so that an optical retailer can measure the far and near vision region of the lens based on the hidden-marks and the lens mark sheet. However, the optical retailer does not always have all of the mark sheets for each manufacturer. Even if they do, it is not easy to keep the mark sheets in good condition. In addition, it is not only difficult to find the hidden-marks, but also time-consuming to place the mark sheet on the framed progressive lens and measure it thereby.

As disclosed in Japanese Patent Laying-Open Publication No. 61-200441, it has been conventionally suggested to measure the far and near vision power by moving a dimension designated by a manufacturer from an optical center of the framed progressive lens. However, this measuring method has a disadvantage that the far and near vision power cannot be measured if a type of the progressive lens is not known in advance.

Throughout the disclosure of the present invention, spherical power designates refracting power of a spherical lens, add power designates relative value of the spherical power of a measuring point with respect to the spherical power in a far vision region in the progressive lens, and cylindrical power designates refracting power of a cylindrical lens. Further, a cylindrical axis indicates a direction when the cylindrical power is zero, prismatic power designates refracting power of a prism, and a progressive band designates an area of the lens having a prescribed width where the cylindrical power is constant while the spherical power varies consecutively.

SUMMARY OF THE INVENTION

An object of the present invention is to provide a lens meter enabling to determine a measuring point of an unidentified progressive lens and to improve an accuracy of the measurement of the near vision power without having the hidden-marks or the lens mark sheet provided by the manufacturers.

The present invention of a lens meter having an optical measuring system which can measure optical characteristics of the progressive lens, comprises: a memory means which stores the optical characteristics of each measuring point measured in a range from the far vision region to the near vision region by the optical measuring system, a distinguishing means which compares the optical characteristics of each measuring point stored in the memory means and distinguishes whether the measured points belong to the progressive band or areas located in either right or left side of the progressive band, a display means which displays the result from the distinguishing means.

The progressive lens is positioned in the optical measuring system of the present invention in order to measure the optical characteristics such as spherical power, cylindrical power and cylindrical axis by the optical measuring system by moving the progressive lens from the far vision region to the near vision region. Each measured value of the optical characteristics is stored in the memory means consequently.

The distinguishing means compares the optical characteristics such as the spherical power and the cylindrical power at each measuring point which are stored in the memory means so as to distinguish whether the measured points belong to the progressive band or the areas located in either the right or left side of the progressive band.

The result of this distinguishing means is displayed by the display means. With this display means, it is easy to decide the measuring position even for an unidentified lens, and thus the near vision power can be measured accurately.

Furthermore, the present invention of the lens meter having the optical measuring system which can measure the optical characteristics of the progressive lens by using measuring luminous flux comprises: a memory means which stores the optical characteristics of each measuring point ranging from the near vision region to the far vision region by the optical measuring system within the measuring luminous flux, a distinguishing means which distinguishes whether the measured points within the luminous flux belong to the progressive band or the areas located in either the right or left side of the progressive band by utilizing an inclination of the optical characteristics stored in the memory means, a display means which displays the result from the distinguishing means.

The progressive lens is positioned in the optical measuring system of the lens meter of the present invention in order to measure the optical characteristics such as spherical power, cylindrical power and cylindrical axis by the optical measuring system by moving the progressive lens from the far vision region to the near vision region as well as utilizing the luminous flux of the optical measuring system. Each measured value of the optical characteristics is stored in the memory means consequently.

The distinguishing means distinguishes whether the measured points belong to the progressive band or the areas located in both right and left sides of the progressive band by utilizing the inclination of the optical characteristics such as the spherical power and the cylindrical power which are measured in each measuring point and stored in the memory means.

The result of this distinguishing means is displayed by the display means. By means of this display means, it is easy to decide the measuring position even for an unidentified lens, and thus the near vision power can be measured more accurately.

Furthermore, the present invention of the lens meter having the optical measuring system which can measure the optical characteristics of the progressive lens comprises a display means which displays at least one of parameters which is selected among various characteristics of the progressive lens including cylindrical power, add power, prismatic power, and distance from the progressive band.

The display means of the present invention visually specifies the characteristics of the progressive lens, while displaying at least one of the parameters which is selected from the add power, the prismatic power, the distance from the progressive band, and the cylindrical power, based on the result from the optical measuring system. By means of this method, it is possible to visually recognize at least one of the values from a peak value of the add power, the prismatic power, the distance from the progressive band, and the cylindrical power of the progressive lens.

Furthermore, the present invention enables to display graphically at least one parameter which is selected from the add power, the prismatic power, the distance from the progressive band, and the cylindrical power in accordance with the foregoing display method.

By means of this structure, it is possible to visually and quickly recognize at least one of the values from the add power, the prismatic power, the distance from the progressive band, and the cylindrical power of the progressive lens.

By means of the display means of the present invention, the add power is displayed in a vertical axis, and either one of the parameters selected from the prismatic power, the distance from the progressive band, or the cylindrical power is displayed in a horizontal axis.

By means of this structure, the add power is displayed in the vertical axis, and either one of the parameters selected from the prismatic power, the distance from the progressive band, or the cylindrical power is displayed in the horizontal axis. Thus, it is easy to recognize the relationship between the add power and either one of the prismatic power, the distance from the progressive band or the cylindrical power in the vertical and the horizontal axes.

Furthermore, in the present invention, a display width of the add power in the horizontal axis which is displayed in a monitor screen of the foregoing display means varies depending on the value of the add power of the progressive lens.

Thus, it is easy to recognize the variation of the add power by observing the variation of the display width in the horizontal axis on the monitor screen.

In the present invention, it is also possible to display the variation of the displaying width of the add power in the vertical axis depending on the measured cylindrical power of the progressive lens.

With this structure, it is possible to visually acknowledge the cylindrical power of the progress lens by looking the variation of the display width in the vertical axis.

Furthermore, in the lens meter of the present invention which measures the optical characteristics of the progressive lens by the optical measuring system and displays the measured result by a display means, the display means alters the add power in a quantitative manner depending on the add power when a measuring point of the progressive lens belongs to the progressive band.

With this structure, since the add power can be displayed in the quantitative manner depending on the add power when the measuring point of the progressive lens belongs to the progressive band. Thus, the variation of the add power in the progressive band can be recognized in the quantitative manner.

Furthermore, by the display means of the lens meter, the present invention can delete the display of the above-mentioned add power when the measuring part is positioned outside the progressive band. In this situation, only an index indicating the measuring part is displayed in the position which is determined by the corresponding add power and either one of the parameter selected from the measured prismatic power, the distance from the progressive band, and the cylindrical power.

By means of this structure, when the measuring point is positioned outside the progressive band, the add power is deleted from the display, and only the index showing the position determined by the above-mentioned add power and either one of the parameters is displayed. Thus, it is possible to clearly acknowledge that the measuring point is not in the progressive band.

In addition, the present invention is adapted to display the add power in the measuring part in a band-form. By means of this band-formed display manner, the add power can be accurately identified.

Furthermore, the present invention is adapted to display the add power in the measured part in a quantitative manner and to delete the display when the measuring point is positioned outside the progressive band.

By means of this structure, it is easy to identify the add power in the quantitative manner, so that a distance of the measuring part from the progressive band can be immediately noticed.

In addition, by means of the above-mentioned display means, the present invention can display the distance of the measuring part from the progressive band in the quantitative manner.

By means of this structure, the measuring point and the distance from the progressive band can be easily obtained in the quantitative manner.

Furthermore, the present invention measures an optical characteristic of the progressive lens by the optical measuring system and displays its result by the display means. The display means displays the distance of the measuring point from the progressive band.

With the above-mentioned structure, it is possible to measure a distance variance of the measuring point from the progressive band.

BRIEF DESCRIPTION OF THE DRAWINGS

FIG. 15 is the display example showing the relationship between the measuring parts of the progressive lens and the displaying manner of the displaying portion.

DESCRIPTION OF THE PREFERRED EMBODIMENTS

Preferred embodiments of the lens meter are described in the following.

Figure 5:
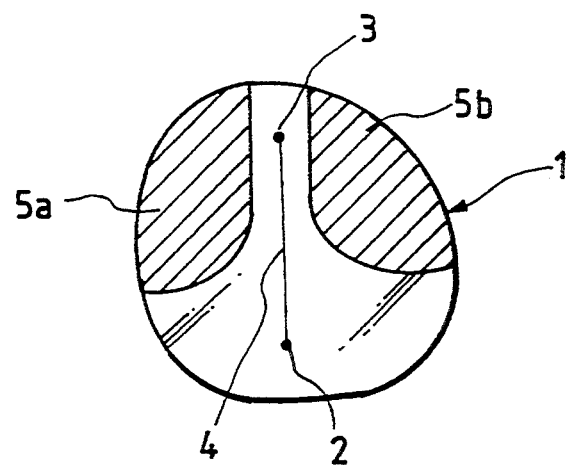
FIG. 5 is a diagram showing the optical structure of the progressive lens.

As in FIG. 5, a progressive lens 1 used for spectacle glasses has a characteristic that add power (spherical power S) varies within a progressive band 4 which is inclusively ranging from a far vision point 2 to a near vision point 3, while cylindrical power C and cylindrical axis A basically remain unchanged. In addition, improper distortion showing astigmatism is appeared in the left region 5a and the right region 5b which are shown in slanted lines. When measuring the left and right regions 5a and 5b, it is found that the cylindrical power C will incline and the cylindrical axis A will vary.

Some of the cylindrical powers C in the regions 5a and 5b are increased as the distance from the progressive band 4 increases, while other cylindrical powers C is decreased as the distance increases.

A lens meter 10 in this preferred embodiment is structured according to this characteristics of the progressive lens 1.

Figure 1:
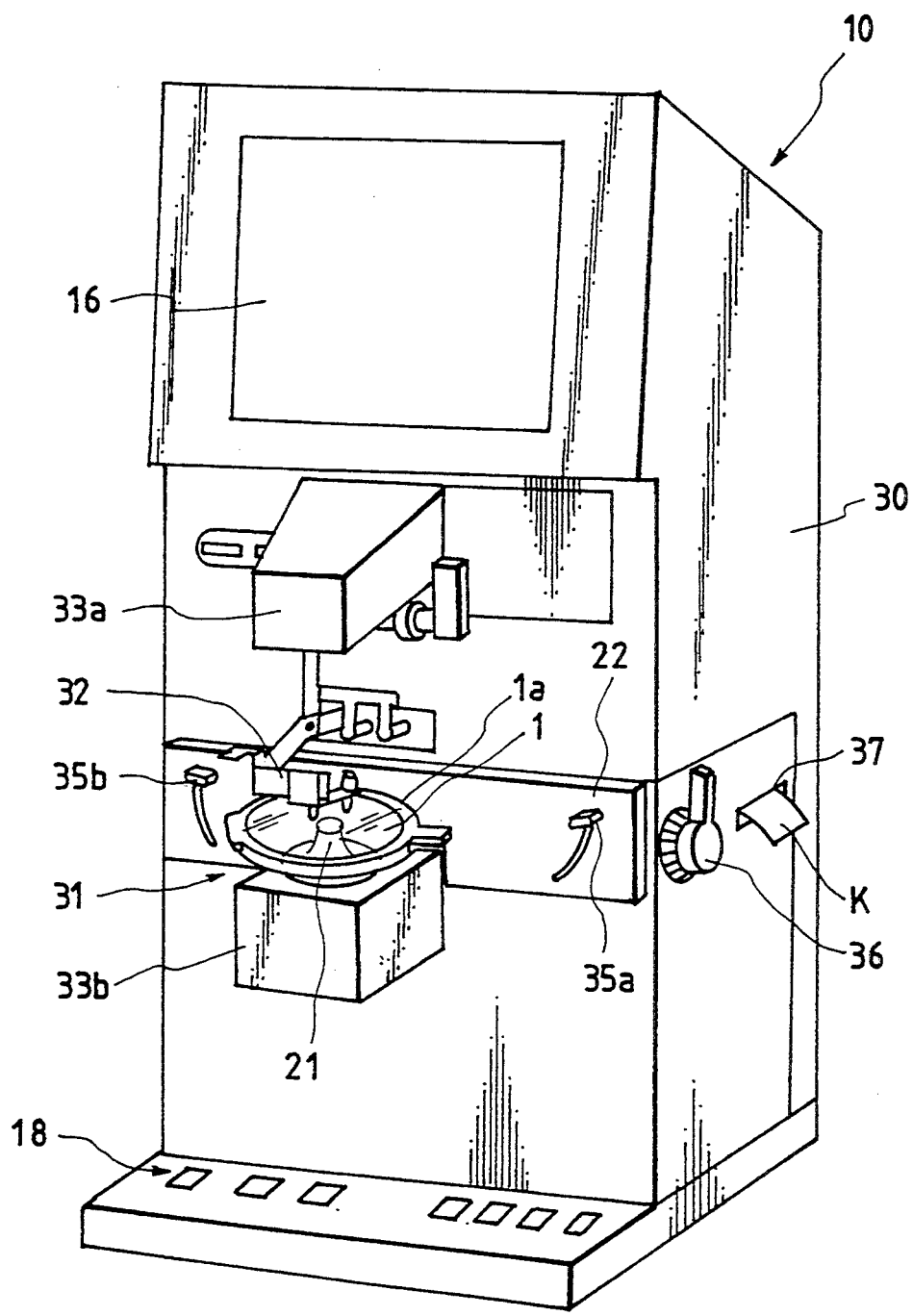
FIG. 1 is a perspective view showing one of the preferred embodiments of the lens meter of the present invention.

Namely, the lens meter 10 shown in FIG. 1 comprises a box-like base unit 30. A lens mounting part 31 is provided at a front center of the base unit 30 wherein the lens 1 to be measured as an optical element is placed. The lens mounting part 31 is comprised of a lens support 21, a lens retainer 32, and a printing mechanism which puts near vision or far marks on the lens surface. Optical units 33a and 33b consisting an optical measuring system 13 are provided in both upper and lower parts of the lens mounting part 31, wherein the optical characteristics of the lens 1 placed on the mounting part 31 is measured so as to convert the measured value to the electric signals.

A lens table 22, having a pair of levers 35a and 35b for mounting a frame of spectacles, is provided on both sides of the lens mounting part 31, wherein the lens table 22 is displaced by a handle 36.

A display means 16 using a CRT display is provided in the upper front of the base unit 30.

An input means 18 comprising a plurality of keys for instructing various kinds of operations is provided in the lower front of the base unit 30.

A paper exit 37 for outputting a paper K from a printer (not shown) is provided in the side of the base unit 30.

Figure 2:
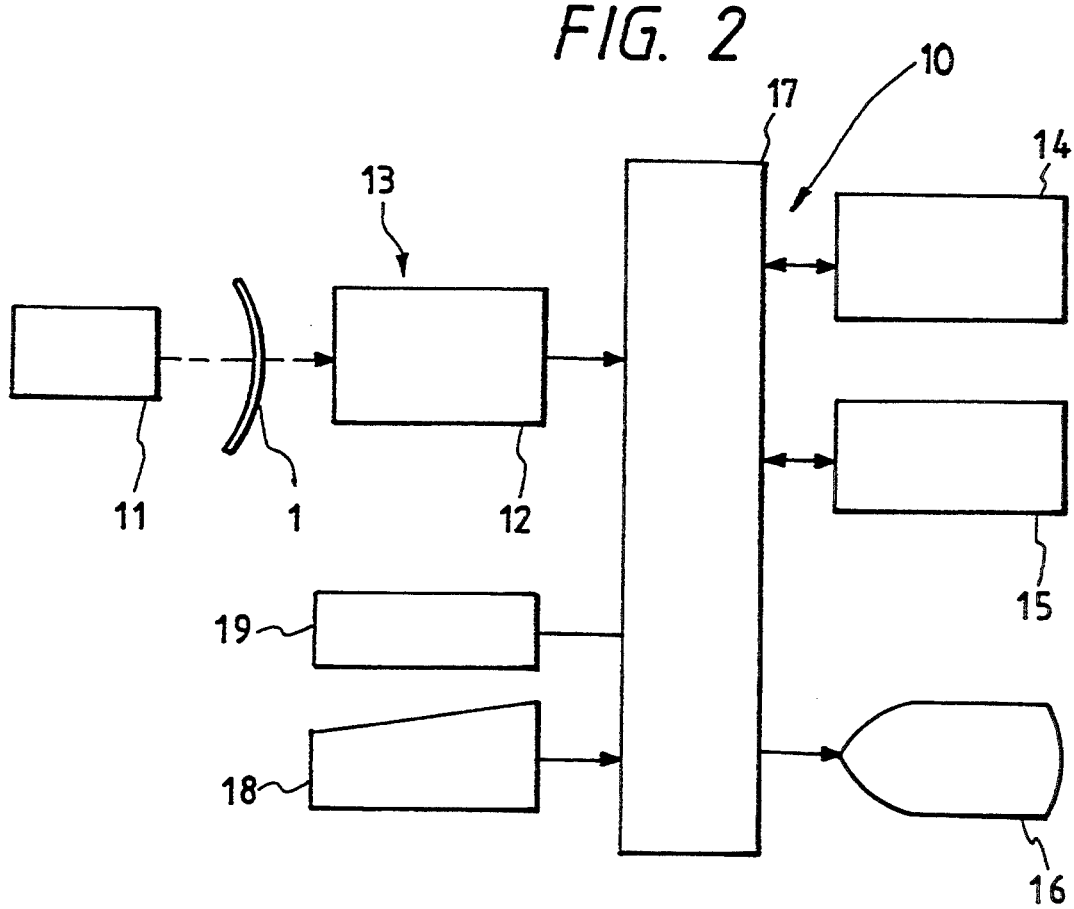
FIG. 2 is a block diagram showing the structure of the lens meter of the present invention.

FIG. 2 shows a block diagram of a control system of the lens meter 10.

Figure 3:
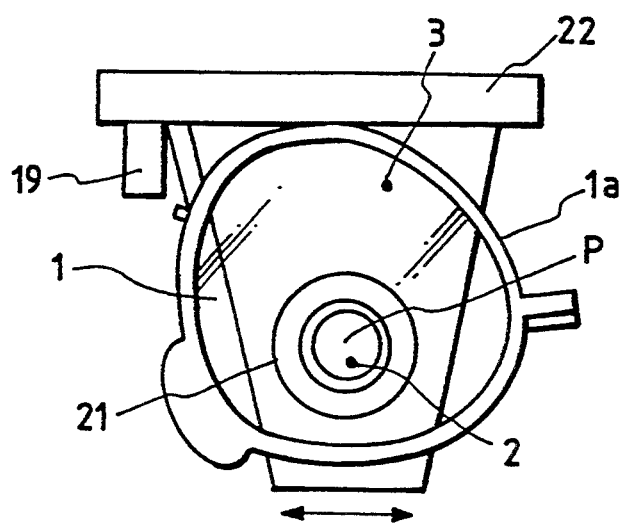
FIG. 3 is a diagram showing the measuring position of the progress lens of the lens meter.

The lens meter 10 includes:

an optical measuring system 13 comprising luminous source 11 and a optical measuring part 12 which are mounted on the optical units 33a and 33b, wherein the optical characteristics such as the spherical power S, the cylindrical power C and cylindrical axis A are measured in each measuring point ranging from the far and near vision regions;

a memory means 14 storing each values of the spherical power, the cylindrical power and cylindrical axis which are measured in the above-mentioned optical measuring system 13;

a distinguishing means 15 which compares the spherical power S and the cylindrical power C in the far vision region and each measuring point which are stored in the memory means 14, and distinguishes whether the measuring points belong to the progressive band 4 or to the either regions located in the left/right sides of the band 4 by utilizing the inclination of the cylindrical power C in the regions 5a and 5b of the progressive band 4;

a display means 16 which displays the result of the distinguishing means 15 in its value or in a graphical manner a control means 17 which controls entire operations of the lens meter;

an input means 18 which inputs measuring instructions to the lens meter;

a micro switch 19 which is adapted to contact with a frame 1a of the progressive lens 1 as shown in FIG. 3, so that the switch can be turned ON for a right eye frame 1a and OFF for a left eye frame 1b because the shapes of the frames for each side are different.

As shown in FIG. 3, the progressive lens 1 which is inserted into the optical measuring system 13 is placed on the lens support 21 with its frame 1a. The frame 1a is attached to the lens table 22, and thus the measurement can be ready thereby.

Figure 6:
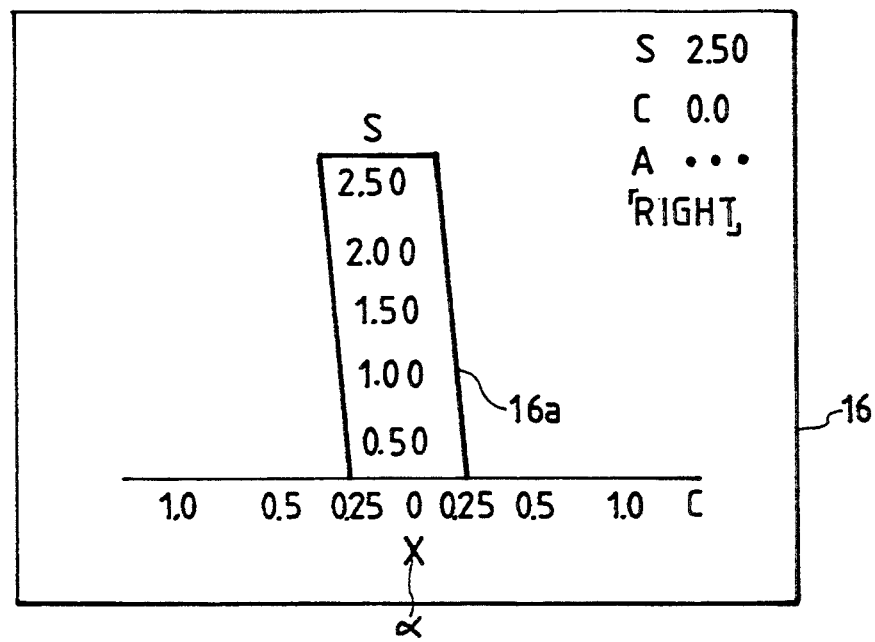
FIG. 6 is a diagram showing one of the display examples of the display means of the lens meter in the preferred embodiment.
Figure 7:
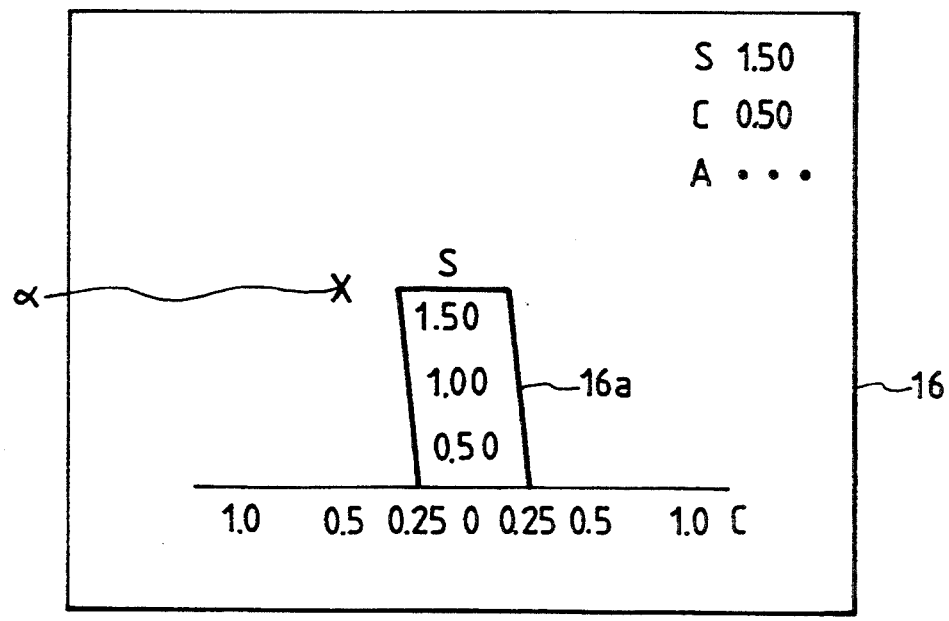
FIG. 7 is another diagram showing other display example of the display means of the lens meter in the preferred embodiment.

As shown in FIGS. 6 and 7, the display means 16 displays the spherical power S in a bar-form along the progressive band based on the result of the distinguishing means 15 under the control of the control means 17.

The position determined by the spherical power S and the cylindrical power C is displayed in an index "α" marked as "x" in either side of the region which is located in the left/right side of the progressive band display part.

Next, an operation of the lens meter 10 having the above-mentioned structure is described in reference to FIGS. 3, 4, 6 and 7.

First, as shown in FIG. 3, the progressive lens 1 for a right eye with the lens frame 1a is placed on the lens support 21 of the lens meter 10 so that the frame 1a is attached to the lens table 22. Since this progressive lens 1 is for a right eye, the outer periphery of the frame 1a is attached to the micro switch 19, so that the switch 19 is turned on. As a result, by means of the control means 17, a "right" mark can be shown on the monitor screen by the display means 16. Thus, an inspector can immediately acknowledge that the progressive lens 1 for a right eye is set therein.

Next, the lens table 22 is slidably moved in the forward/backward directions so that the far vision region 2 as a measuring position P can be positioned on the lens support 21 of the lens meter 10. In the meantime, the progressive lens 1 is also slidably moved in the right-/left (arrow in FIG. 3) directions. Then, the spherical power S, the cylindrical power C, and the cylindrical axis A are measured as the far vision power while verifying that the spherical power S, the cylindrical power C, and the cylindrical axis A remain the same.

The measured results of the spherical power S, the cylindrical power C and the cylindrical axis A are stored in the memory means 14 by the command from the control means 17. These results are shown in value and graphic forms by the display means 16 as shown in FIG. 6.

Since the measuring position P substantially matches with the far vision region 2, the index α is displayed as in FIG. 6.

Figure 4:
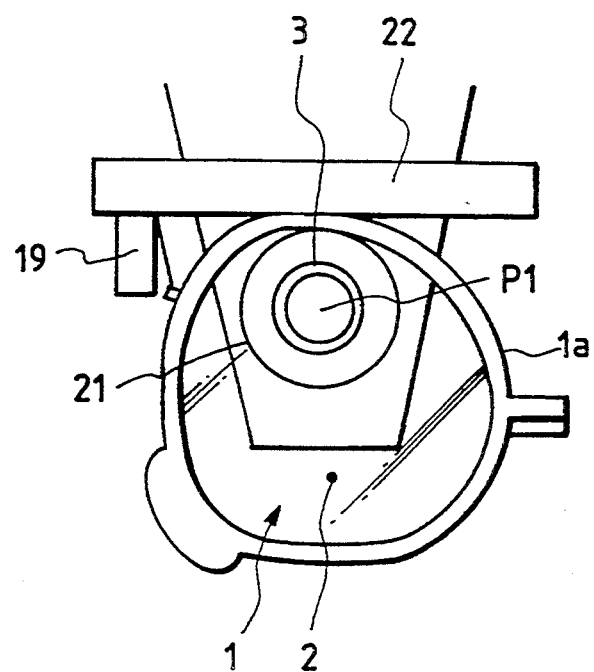
FIG. 4 is another diagram showing the measuring position of the progress lens of the lens meter.

Next, as shown in FIG. 4, the lens table 22 slidably shifts so that the measuring point $P_1$ of the left region 5a in a vicinity of the near vision region 3 can be positioned on the lens support 21. Then, the spherical power S, the cylindrical power C and the cylindrical axis A of the measuring point $P_1$ in the left region 5a are measured by the optical measuring system 13 and the measured results are forwarded to the control means 17.

Under the control of the control means 17, the distinguishing means 15 compares the spherical power S and the cylindrical power C which are measured by the optical measuring system 13 at the measuring position $P_1$ in the left region 5a with the corresponding spherical power S and the cylindrical power C positioned in the far region 2 which are stored in the memory means 14. In the mean time, it distinguishes that the measuring position $P_1$ in this case is positioned in the left side of the progressive band 4 by utilizing the inclination of the cylindrical power C in the left region 5a, and this result is transferred to the control means 17.

The control means 17 controls the display means 16 based on the result from the distinguishing means 15 and displays the index α, which shows that the measuring position $P_1$ is positioned in the left side of the progressive band 4, in the left side of the progressive display part 16a as shown in FIG. 7. FIG. 7 shows an example when the spherical power S is 1.50, the cylindrical power C is 0.50.

As in the foregoing, by means of the lens meter 1 of the present invention, it is easy to acknowledge the measuring positions even if the progressive lens to be tested is not identified, and the near vision power can be measured accurately. When the measuring point belongs to the progressive band 4, the display means 16 displays the spherical power S in a bar-shape in the progressive band display part 16a. When the measuring point belongs to the region 5a located in the left side of the progressive band 4, the position determined by the spherical power S and the cylindrical power C is displayed by the index α in the progressive band display part 16a which indicates that the position is in the left region 5a. Thus, an inspector can visually recognize the actual measuring position.

Furthermore, since the progressive band display part 16a is slanted, it can correspond to the inclination of the progressive band 4 of the progressive lens 1 and thus enables more clear visual recognition.

Figure 8:
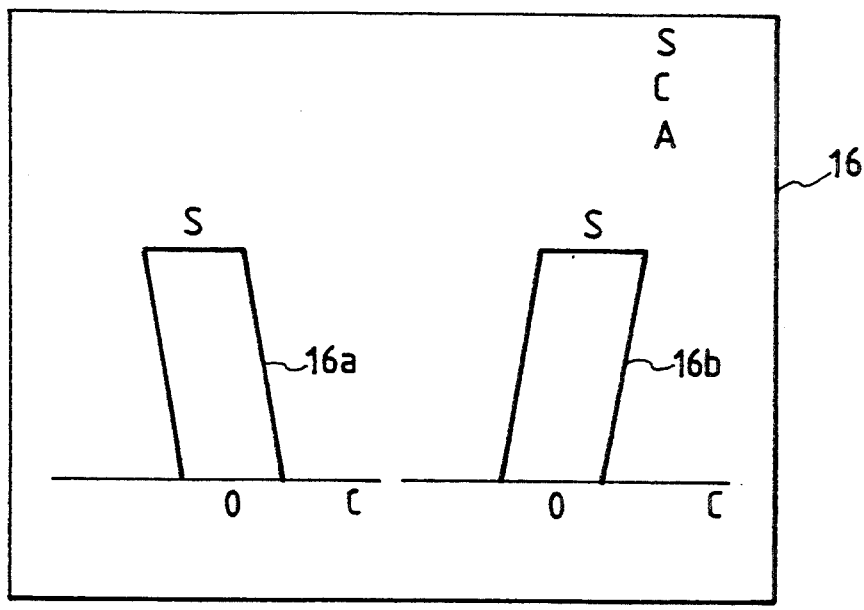
FIG. 8 is another example showing the display manner of the display means of the lens meter in the preferred embodiment.

Further to the examples in FIGS. 6 and 7, the display means 16 can graphically display, as in FIG. 8, containing the progressive band display part 16b for a left eye in addition to the progressive band display part 16a for a right eye at the same time.

Another embodiment of the present invention is discussed in the following in reference to FIG. 9.

Figure 9:
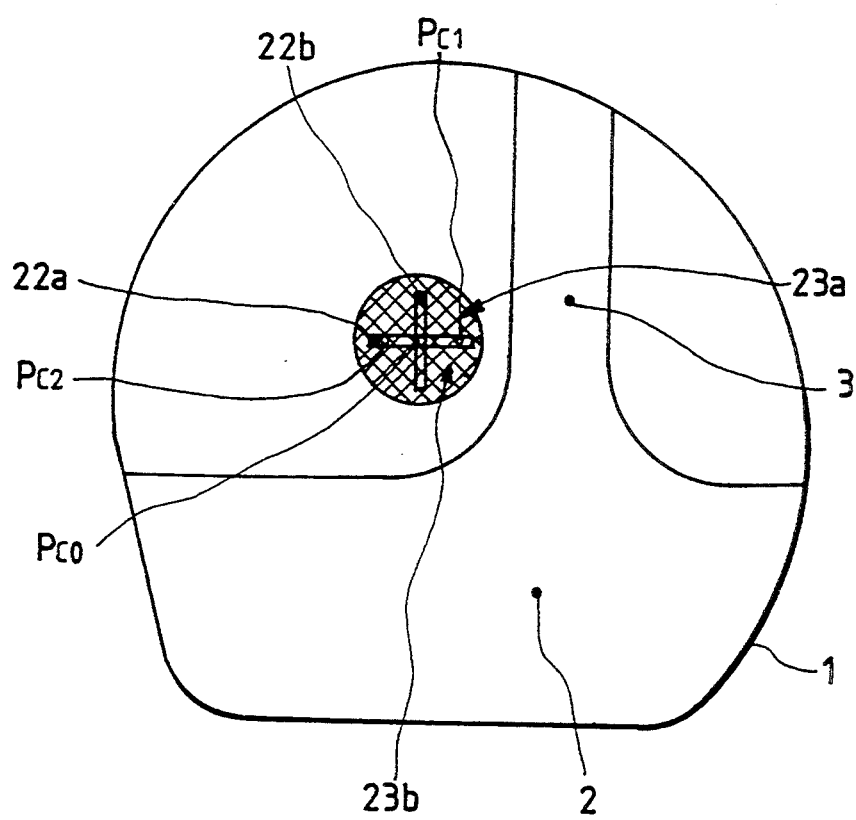
FIG. 9 is a diagram showing the structure of the optical measuring system of another preferred embodiment regarding the lens meter of the present invention.

As the optical measuring system 13, the embodiment shown in FIG. 9 comprises the luminous sources 11 emitting the luminous fluxes 23a and 23b which are shown in slanting lines, and a pair of CCD elements 22a and 22b which is provided crosswise on the lens support 21.

Each cylindrical power $C_{C0}$, $C_{C1}$ and $C_{C2}$ of the measuring positions $P_{C0}$, $P_{C1}$ and $P_{C2}$ can be measured by the luminous fluxes 23a and 23b emitting to the pair of the CCD elements 22a and 22b from the luminous source 11 through the progressive lens 1. Then, the inclination of the cylindrical power C can be distinguished by the distinguishing means 15 based on the differences of the cylindrical power $C_{C0}$, $C_{C1}$ and $C_{C2}$ and then displayed similarly as in FIGS. 6 and 7.

In this case, the inclination of the cylindrical power C sometimes does not increase as the distance from the progressive band 4 increases. However, by repeating the above measurement for several times, a tendency of the inclination of the cylindrical power C can be determined. Thus, an inspector can obtain actual measuring positions.

In addition, it is possible to distinguish whether the progressive lens 1 to be tested is for a right eye or a left eye in only one measurement, by enlarging the measuring region by the CCD elements 22a and 22b in the optical measuring system 13 in FIG. 9.

Next, another embodiment of the present invention is discussed in the following in reference to FIGS. 10-19.

Figure 10:
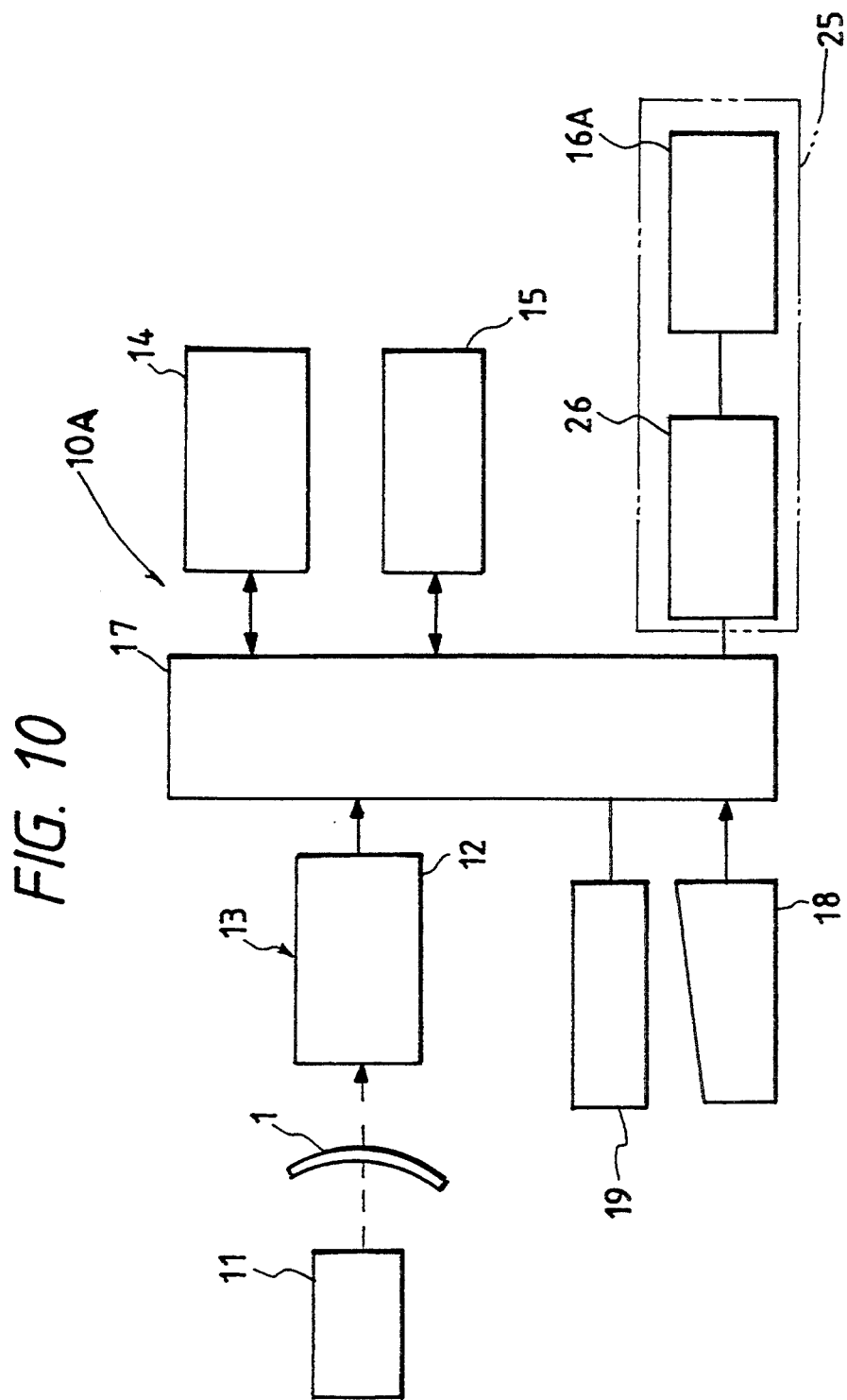
FIG. 10 is a block diagram showing the structure of other preferred embodiment of the lens meter.

A lens meter 10A shown in FIG. 10 has the same structure as the lens meter 10 in FIG. 1, but it is characterized to include a display means 25. The display means 25 comprises a monitor screen 16A utilizing a CRT display or a liquid crystal display instead of the foregoing display means 16, and a display drive 26 which alters the display manner of the monitor screen 16A under the control of the control means 17. The display drive 26 includes a pattern memory which stores display patterns corresponding to the cylindrical power, spherical power and the like, and a display controller which reads out the display pattern and provides the display pattern and the data from the distinguishing means 15 to the monitor screen 16a under the control of the control means 17.

An operation of this lens meter 10A is described in the following, focusing on the display manner of each characteristic of the progressive lens 1 which is displayed in the monitor screen 16A.

Each value such as the cylindrical power C, the add power S, prism diopter Pr(Δ), the cylindrical axis A, and a pupil distance PD of the progressive lens 1 which are measured by the foregoing optical measuring system 6 are forwarded to the display drive 26 under the control of the control means 17.

Figure 11:
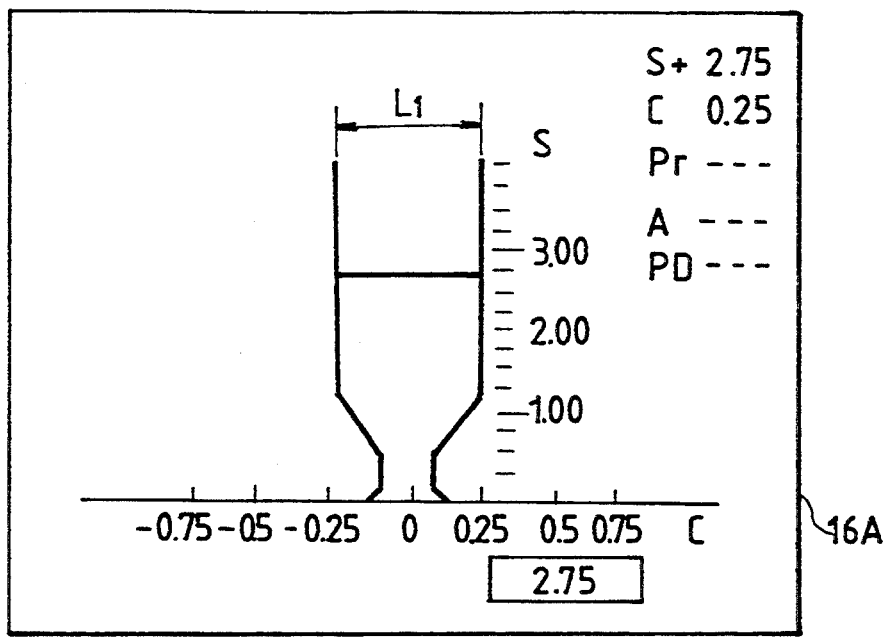
FIG. 11 shows one of the display examples of the display means of preferred embodiment shown in FIG. 10.

The display drive 26 forwards the displaying information based on the provided program for display. For example, as shown in FIG. 11, the add power S is expressed in a vertical line, the cylindrical power C is expressed in a horizontal line. In this case, the add power S is expressed in a bar graph having a constant width $L_1$. In FIG. 11, the peak values of the add power S is 2.75 and 0.25 for the cylindrical power C.

Furthermore, the peak value 2.75 of the add power S is displayed in the monitor screen 16A as value information.

Figure 12:
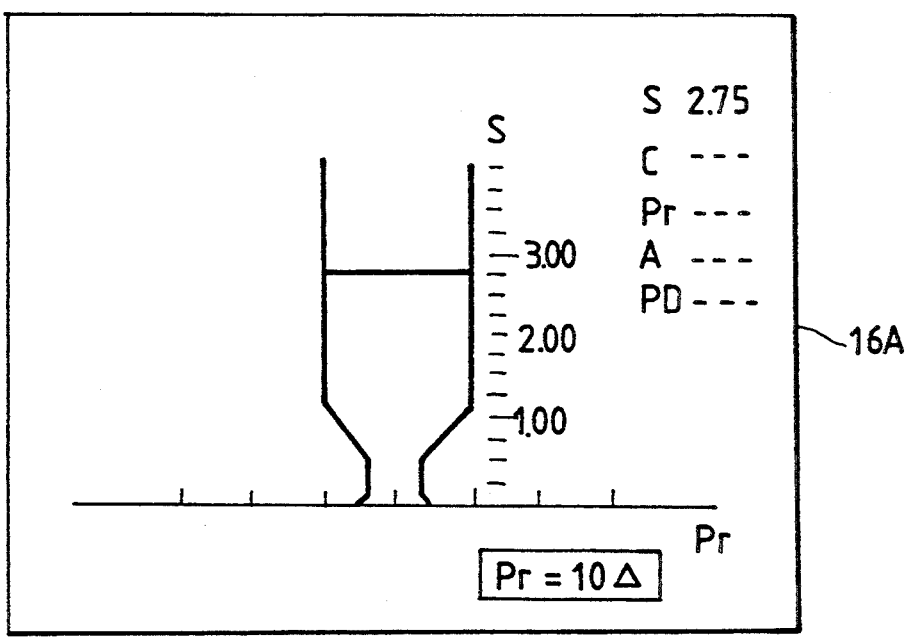
FIG. 12 shows other display example of the display means of the preferred embodiment shown in FIG. 10.

As shown in FIG. 12, among the characteristics of the progressive lens 1, the add power S can be set in the vertical line and the prism Pr can be set in the horizontal line. FIG. 12 shows an example when the peak value of the add power S is 2.75 and the prism value is 10Δ.

Figure 13:
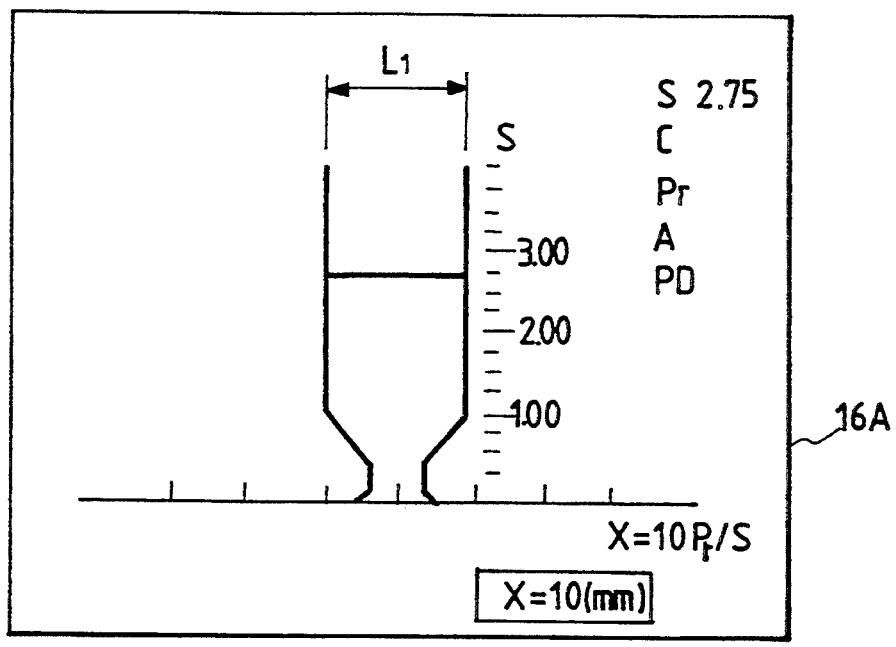
FIG. 13 shows other display example of the display means of the preferred embodiment shown in FIG. 10.

In addition, as shown in FIG. 13, the add power S can be set in the vertical line and the distance X (mm) (=10 Pr/S, according to Prentice formula) of the measuring position from the center of the progressive band can be set in the horizontal line. The example shows a case where the peak value of the add power S is 2.75 and the distance X is 10 millimeters (mm).

By means of the foregoing displaying manner shown in FIGS. 11–13, it is easy to visually recognize each value of the progressive lens 1 such as the peak value of the add power S, the prism Pr, the distance X (mm) from the center of the progressive band, and the cylindrical power C.

Figure 14:
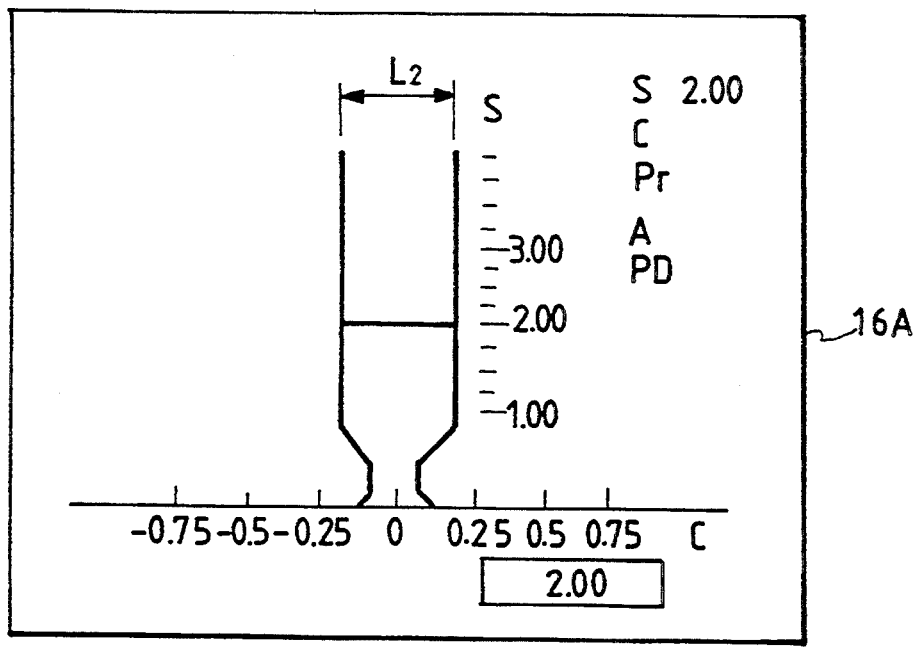
FIG. 14 is the display example showing the variation of the width of the cylindrical power of the preferred embodiment of FIG. 10.

As in FIG. 14, when the add power S of the progressive lens 1 is 2.00, the width $L_2$ of the bar graph shown in the monitor screen 16A is set narrower than the width in FIG. 11. The peak value of the add power S is set up to a scale range showing 2.00 in the drawing. Thus, the variation of the add power S can be easily visualized both in the peak value and the width of the bar graph.

Next, the relationship between the measuring points P, $P_2$, and $P_3$ of the progressive lens 1 and the display manner of the monitor screen 16A is discussed in the following in reference to FIGS. 15–17.

Figure 16B:
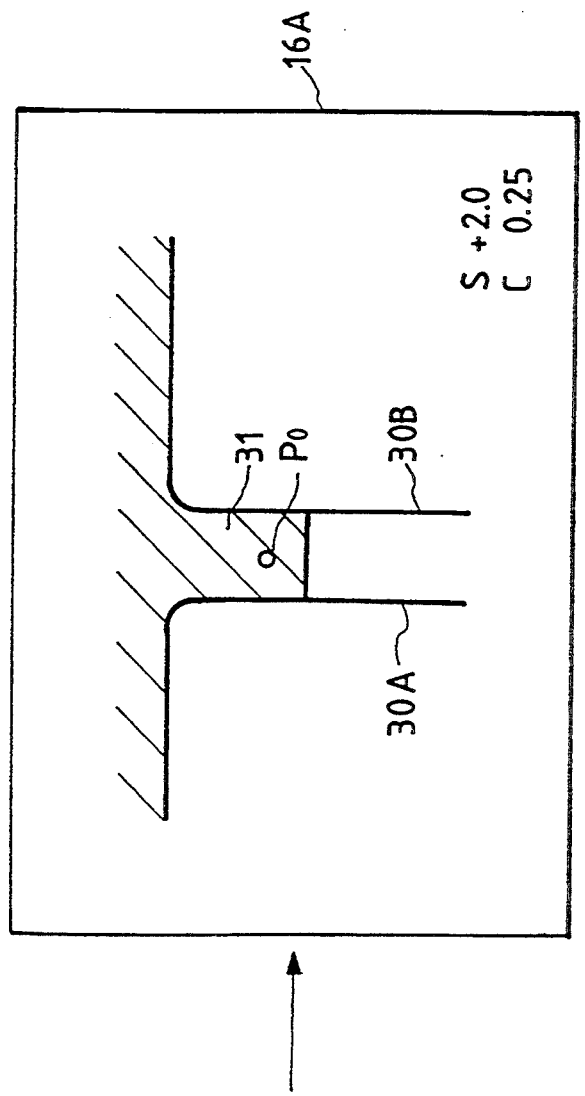
FIG. 16 also shows the relationship between the measuring parts of the progressive lens and the displaying manner of the displaying portion.
Figure 16A:
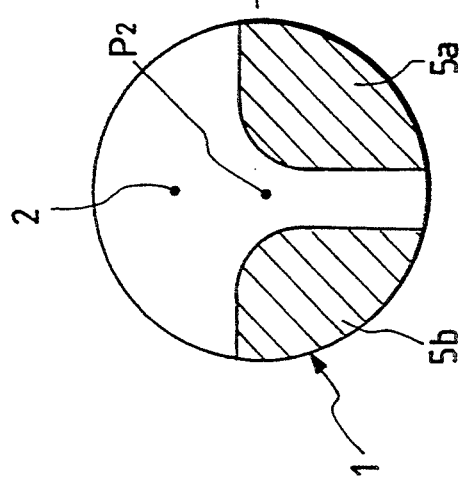
Figure 17B:
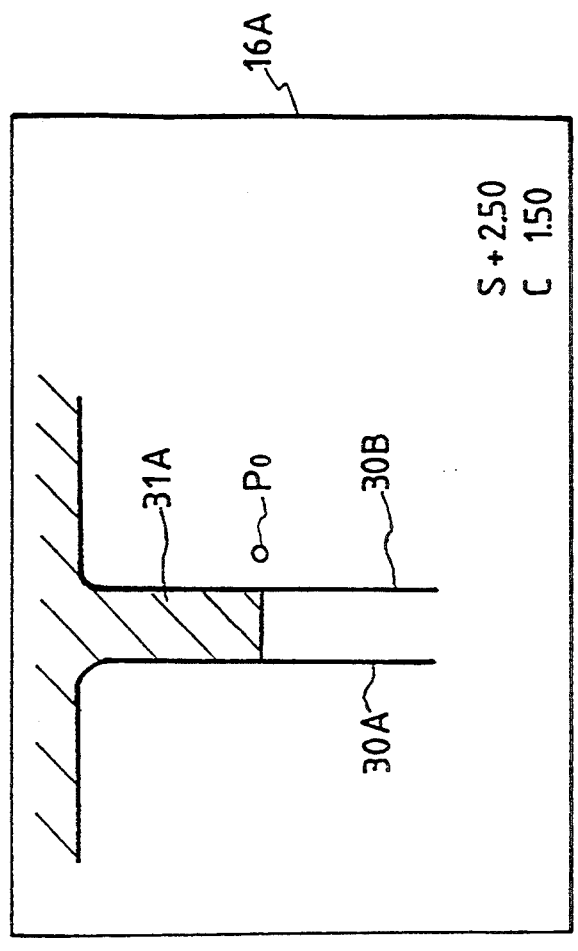
FIG. 17 also shows the relationship between the measuring parts of the progressive lens and the displaying manner of the displaying portion.
Figure 17A:
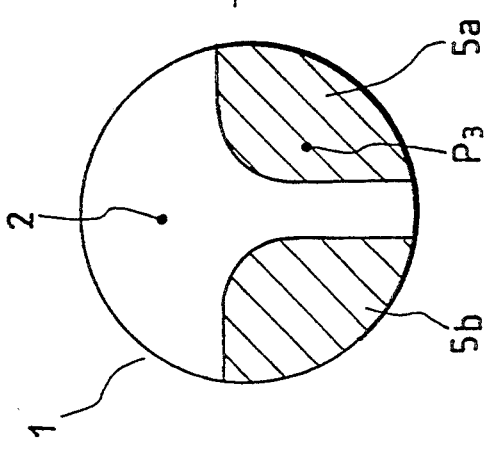

FIGS. 15–17 show a case where the width of the progressive band 4 increases with the decrease of the add power S. As shown in FIG. 15, if the measuring point of the progressive lens 1 is equal to P corresponding to the far vision part 2, a pair of border lines 30A and 30B having narrow width which divides the progressive band 4 and other region is displayed on the monitor screen 16A. In FIG. 15, $P_0$ shows an original point indicating the measuring position of the lens meter 10A.

Next, as shown in FIG. 16, the measuring point of the progressive lens 1 is moved to $P_2$ in a vicinity of the near vision point 3. The width of the border lines 30A and 30B becomes wider than that in FIG. 15 by corresponding to the add power of +2.0, and a bar graph 31 corresponding to said add power is appeared on the screen. Then the position of the border lines 30A and 30B goes up in the monitor screen 16A as much as the measuring point of the progressive lens 1 is moved. At this time, the original point $P_0$ remains in the same position.

Further, as shown in FIG. 17, the measuring point of the progressive lens 1 is moved up to $P_3$ positioning outside the progressive band. The width of the border lines 30A and 30B becomes wider than that in FIG. 15 by corresponding to the add power of +2.5, and a bar graph 31A corresponding to said add power is appeared on the screen. Then, the position of the border lines 30A and 30B slides to a transverse direction in the monitor screen 16A as much as the measuring point of the progressive lens 1 is moved. The original point $P_0$ still remains the same position.

Therefore, the movement of the measuring points of the progressive lens 1 corresponds to this displaying manner of the monitor screen 16A. Thus, it is easier for an inspector to visually recognize each characteristic of the progressive lens 1.

Figure 18:
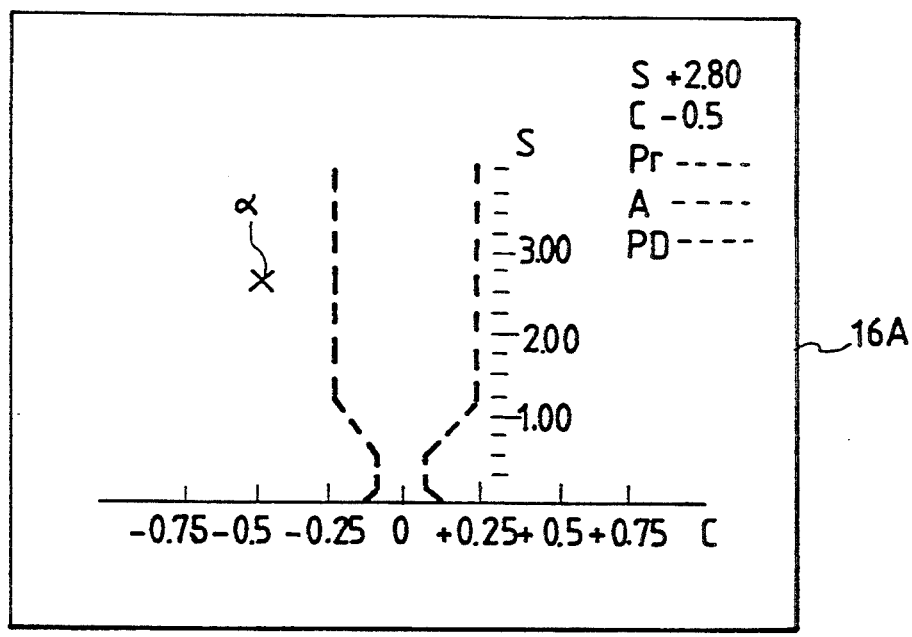
FIG. 18 shows the displaying manner of the display portion when the measuring part is slipped out of the progressive band.

In addition, when the measuring point of the progressive lens 1 positions inside the progressive band, the add power S is shown in the bar graph having the width according to the power. When the measuring point of the progressive lens 1 positions outside the progressive band, the bar graph is disappeared as shown in FIG. 18, and instead, the index α indicates the position which is determined by the corresponding add power S and the cylindrical power C.

Therefore, the add power S in the progressive band can be visually recognized, and the characteristic of the progressive lens 1 can be easily recognized when the measuring point is positioned outside the progressive band.

Figure 19:
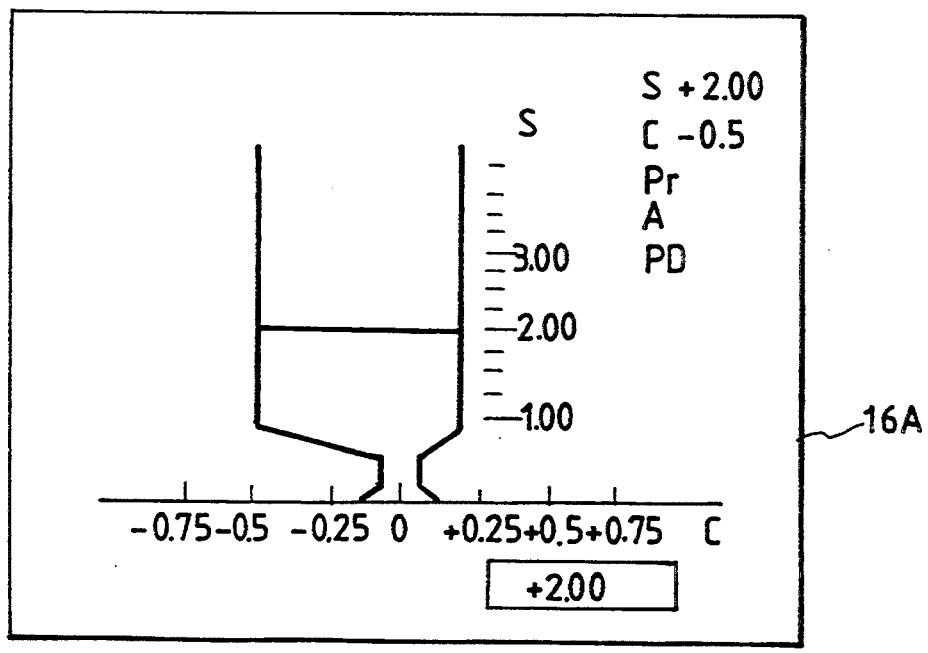
FIG. 19 shows the variation of the displaying manner depending on the cylindrical power.

Furthermore, when the add power S of the progressive lens 1 is +2.00 and the cylindrical power C is −0.5, the vertical lines of the bar graph can be expanded to a transverse direction as shown in FIG. 19 so that the left side of the vertical line can correspond to the value of the cylindrical power C. Therefore, the variation of the cylindrical power C of the progressive lens 1 can be easily recognized.

The present invention can also be modified within a scope of the invention, other than the foregoing embodiments.

For example, in the foregoing embodiments, although the spherical power S is shown in the bar graph on the monitor screen, it can be displayed in lines.

The index α indicates the position which is determined by the cylindrical power C in the vicinity of the progressive band in the foregoing embodiments. However, it is regardless to say that the index can be marked in other forms than "x" mark.

In addition, the present invention refers only to the framed progressive lens though, it is applicable to the measurement of an uncut lens. It is also applicable to a progressive lens having prism thinning treatment.

What is claimed is:

1. A lens meter having an optical measuring system enabling to measure optical characteristics of a progressive lens having a far vision region and a near vision region in a progressive band, comprises:

a memory for storing optical characteristics of measuring points ranging from said far vision region to said near vision region measured by said optical measuring system;

a distinguishing part for comparing said optical characteristics of each measuring point stored in said memory and distinguishing whether said measured points belong to a right or left side of said progressive band;

a display for graphically displaying a result provided from said distinguishing part such that said progressive band is graphically illustrated to be distinguishable from said measuring points in said right side and said left side of said progressive band.

said display shows a combination of add power of said progressive lens and at least one of parameters selected from prismatic power, distance from said progressive band, and cylindrical power of said progressive lens, said add power and said selected parameters are displayed with respect to the position of said measuring points in said progressive lens, wherein said add power designates a relative value of refracting power of a spherical lens with respect to that of far vision region in the progressive lens, and cylindrical power designates refracting power of a cylindrical lens, and said prismatic power designates refracting power of a prism; and said display alters said add power which is graphically displayed and a display width in a horizontal axis depending on a determined value of said add power of said progressive lens.

2. A lens meter as defined in claim 1, wherein said display alters a display width of said add power in a vertical axis depending on said measured cylindrical power of said progressive lens.

3. A lens meter as defined in claim 1, wherein said display displays said add power in a vertical axis, and displays one of said parameters which is selected from said prismatic power, said distance from said progressive band, or said cylindrical power in a horizontal axis.

4. A lens meter measuring optical characteristics of a progressive lens by an optical measuring system and displaying a measured result by a display comprises:

said display alters graphical showing of add power of said progressive lens in a quantitative manner depending on a measured value of said add power when a measuring point of said progressive lens belongs to a progressive band, wherein said add power designates a relative value of refracting power of a spherical lens with respect to that of far vision region in the progressive lens.

said display is adapted to display said add power in said measuring point in a band-form.

5. A lens meter as defined in claim 4, wherein said display is adapted to display said add power in said measuring point in a quantitative manner and to delete said display when said measuring point is positioned outside said progressive band.

6. A lens meter as defined in claim 4, wherein said display displays a distance of said measuring point from said progressive band in said quantitative manner.

7. A lens meter as defined in claim 4, wherein said display is adapted to display a peak value of said add power in said measured part in a quantitative manner.

8. A lens meter as defined in claim 4, wherein said display is adapted to graphically display both a progressive band display for right eye and a progressive band display for left eye.

9. A lens meter as defined in claim 4, wherein said display is adapted to alter each inclination state of said progressive band displays.

10. A lens meter as defined in claim 4, wherein said display deletes said display of said add power when said measuring point of said progressive lens is positioned outside said progressive band, and displays a mark indicating a position of said measuring point and one of parameters selected from measured prismatic power, a distance from said progressive band, and cylindrical power of said progressive lens corresponding to said measuring point.

* * * * *